(12) United States Patent
Chen et al.

(10) Patent No.: US 6,608,679 B1
(45) Date of Patent: *Aug. 19, 2003

(54) SPECTROPHOTOMETRIC ANALYSIS OF INPUT LIGHT

(75) Inventors: Jingkuang Chen, Ann Arbor, MI (US); Joel A. Kubby, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,184

(22) Filed: Dec. 20, 1999

Related U.S. Application Data

(60) Provisional application No. 60/113,240, filed on Dec. 21, 1998.

(51) Int. Cl.[7] .................................. G01J 3/36
(52) U.S. Cl. ....................................... 356/328
(58) Field of Search ................. 356/319, 326, 356/328

(56) References Cited

U.S. PATENT DOCUMENTS

| | | | |
|---|---|---|---|
| 5,020,910 A | * 6/1991 | Dunn et al. | 356/328 |
| 5,066,126 A | * 11/1991 | Hatori | 356/308 |
| 5,080,465 A | * 1/1992 | Laude | 216/24 |
| 5,423,286 A | * 6/1995 | Yonehara | 117/106 |
| 5,731,874 A | * 3/1998 | Maluf | 356/326 |
| 6,002,479 A | * 12/1999 | Barwicz et al. | 356/326 |
| 6,249,346 B1 | * 6/2001 | Chen et al. | 356/328 |

FOREIGN PATENT DOCUMENTS

| | | | |
|---|---|---|---|
| JP | 06003709 | * | 1/1994 |
| WO | WO 99/17338 | * | 4/1999 |

OTHER PUBLICATIONS

Surface–Micromachined Diffraction Gratings for Scanning Spectroscopic Applications, Meng–Hsiung Kiang, Jocelyn T. Nee, Kam Y. Lau and Richard S. Muller, University of California at Berkeley, Transducers 97, 1997 International Conference on Solid–State Senors and Actuators, Chicago, Jun. 16–19, 1997.

Scanning Blazed–Gratings for High–Resolution Spectroscopy, Jocelyn T. Nee, Kam Y. Lau and Richard S. Muller, Department of EECS, University of California at Berkeley.

* cited by examiner

Primary Examiner—Zandra V. Smith
(74) Attorney, Agent, or Firm—Robert A. Burtzlaff

(57) ABSTRACT

A micro spectrophotometer is monolithically constructed on a silicon substrate. The spectrophotometer includes a concave grating, which is used for dispersing optical waves as well as focusing reflected light onto a photodiode array sited on a silicon bridge. The silicon bridge is bent 90° from the surface of the silicon substrate in order to orthogonally intersect the output light from the grating. A precision notch is defined in the silicon substrate for coupling to an optical input fiber. Signal processing circuitry is etched on the substrate using conventional CMOS processes for initial processing of information received from the photodiode array.

20 Claims, 3 Drawing Sheets

SPECTROPHOTOMETRIC ANALYSIS OF INPUT LIGHT

Priority is claimed to Provisional patent application, D/98776P, Serial No. 60/113,240, Filed Dec. 21, 1998, entitled; MONOLITHIC SPECTROPHOTOMETER, by Jingkuang Chen and Joel A. Kubby.

FIELD OF THE INVENTION

The present invention is directed to improved spectrophotometric analysis of input light. More particularly, a method for dispersing light with a monolithic spectrophotometer is described.

BACKGROUND AND SUMMARY OF THE INVENTION

Spectrophotometers are optical instruments which separate optical signals according to their wavelengths. They have broad applications including color identification in flat panel displays or electronic cameras, color control for xerographic printing, optical spectroscopy for chemical analysis, environmental monitoring, and process controls which are related to color identification. Up to date, all commercial spectrophotometers tend to be of rather large size because they are formed by assembling bulky optical elements, mechanical parts, detectors, and microelectronic chips into a system. This current assembly process needs high precision and is labor intensive, keeping the cost of conventional bench top spectrophotometers from being affordable. There are many additional applications of interest which would arise if spectrophotometer were of significantly lower cost, lighter weight, smaller size, rugged, and incorporated signal processing capability in the instrument. In xerographic printing, a spectrophotometer is a key component in a closed-loop color control system which will enable the printers to generate reproducible color images in a networked environment. The development of a compact, low cost spectrophotometer is thus important ox in realizing high performance printing systems.

With the advance of micromachining technology, it is now possible to build various microstructures, movable mechanical components, micro optical elements, including free-space, out-of-plane lenses and gratings, sensors, and electronic circuits on silicon chips using modified IC processes that are able to produce thousands of these devices in batch on silicon wafers. Over the past decade, much effort has been devoted to the development of micro spectrophotometers using MEMS technology. However, none of these initial efforts were successful, partly because of the technical difficulty associated with the integration of high-precision optical elements and photo-detectors in a system. The fabrication of these spectrophotometers needs either a high-precision wafer-to-wafer bonding or special thin film deposition processes for building microgratings or dispersive waveguides on a chip. The alignment of these optical elements with the photodetectors is very critical. Any misalignment in the scale of as small as one micro meter will result in significant deviation in device performance. As a result, none of these prototype devices has been commercialized thus far.

This spectrophotometer incorporates concave gratings, photo diode array, and signal processing circuitry on a silicon substrate and is significantly reduced in size, weight, and cost. On the spectrophotometer chip, the concave gratings for optical wave separation may be defined using a dry etch on either crystal silicon or polyimide. The optical elements and the photo diode array may be defined using photolithography on the same silicon substrate, eliminating the complicated alignment and assembling processes which are generally required for fabrication of conventional spectrophotometers. In order to effectively sense the light reflected from the gratings, the photo diode array is built on a suspended silicon bridge which is bent 90 degrees from the wafer surface. The integration of signal processing circuitry further enhances its function and improves the signal-to-noise ratio, resulting in a high resolution spectrum analysis system.

In the present invention, a fully monolithic spectrophotometer on silicon using MEMS technology is described. This spectrophotometer incorporates concave gratings, a photo diode array, and signal processing circuitry on a silicon substrate and is drastically reduced in size and intricacy. On this chip, the concave gratings for optical wave separation is defined using a dry etch on either crystal silicon or polyimide. The optical elements and the photo diode array are defined using photolithography on the same silicon substrate, eliminating the complicated alignment and assembling processes which are generally required for fabrication of conventional spectrophotometers. In order to orthogonally intersect the light reflected from the gratings, the photo-diode array is built on a suspended silicon bridge which is bent 90° from the wafer surface. In this way, the dispersed wave signals, which on this device are designed to propagate along the silicon wafer surface, can be very efficiently sensed by the photodiodes. On this chip, CMOS circuitry and the photodiode array are built at the same time using the same process such that output signals from the photodiodes can be amplified and multiplexed on-chip, decreasing noise pick-up, and allowing conveyance of output signals through a common data bus. This monolithic structure results in a compact spectrophotometer of significantly reduced size and weight. Its cost will also be lowered from the current commercial products because a simplified fabrication process is used.

Additional functions, objects, advantages, and features of the present invention will become apparent from consideration of the following description and drawings of preferred embodiments.

DETAILED DESCRIPTION OF THE INVENTION

Figure 1:
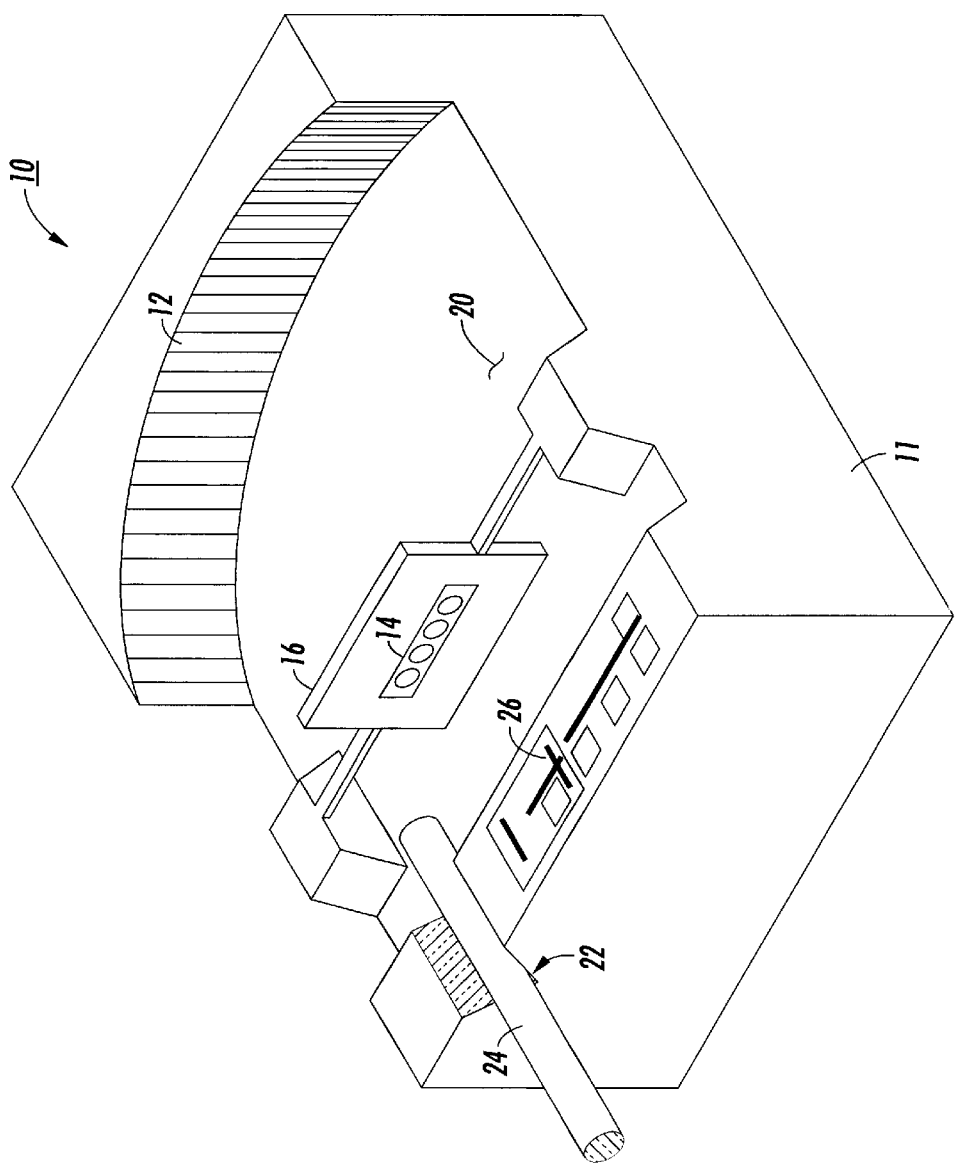
FIG. 1 schematically illustrates in perspective view a monolithic microspectrophotometer having optical gratings, a photodiode array, and signal processing circuitry integrated on a silicon chip.

FIG. 1 is a perspective view of a micro spectrophotometer 10 monolithically constructed on a silicon substrate 11 in accordance with the present invention. The micro spectrophotometer include a concave grating array 12, which is used for dispersing optical waves as well as focusing reflected light onto the photodiode array 14 sited on a silicon bridge 16. The silicon bridge 16 is bent 90 degrees from the wafer surface 20 in order to orthogonally intersect the output light from the grating array 12. A precision notch 22 is defined the silicon substrate 11 for coupling to an optical input fiber 24. Signal processing circuitry 26 is etched on the substrate 11 using conventional CMOS processes for initial processing of information received from photodiode array 14.

Advantageously, all of the optical elements, photodiodes, and related microstructures on the micro spectrophotometer 10 are defined using photolithography on the same silicon substrate 11. As a result, no manual adjustment or alignment between the optical components and the detectors is required after the IC processes for device fabrication. This is critical in reducing the manufacturing cost as well as enhancing the precision of the system.

Conventional photolithographic and etching techniques can be used to construct micro spectrophotometer 10. The grating array 12 is fabricated by a photolithographic patterning and a dry etch on either crystal silicon or polyimide to form facets perpendicular to the wafer surface. Using advanced dry etch technologies, deep vertical microstructures can be carved into crystal silicon in a reasonable time period. Some novel etch technologies can etch trenches as deep as 500 $\mu$m into silicon with an aspect ration as high as 100. However, the side walls of these dry-etched trenches are generally very rough and are not suitable as facets for optical applications. In order to improve the smoothness of these facets, post processes including a thermal oxidation and a subsequent wet etch for removing the oxide grown is generally required for eliminating these sidewall defects. The deep silicon etch and its post processes bring difficulty in combining this process with the integration with other microstructures and circuitry because it is difficult to do photolithography on a non-planar wafer surface. As a result, processes like trench refill are generally required for alleviating the problem. Alternatively, polyimide based processes can be used, since it is comparatively easier in to shape into high-aspect-ratio microfacets. However, polyimide is prone to be attacked by either ethylene-diamine pyrocatechol (EDP) or TMAH etch, which is required for releasing the micro bridge on the micro spectrophotometer 10. Accordingly, a reliable passivation process is required for protecting the polyimide microstructures if polyimide grating is to be used on this device.

Input optical waves are coupled into the spectrophotometer through an optical waveguide, as shown in FIG. 1. In preferred embodiments, the input optical waves are received from optical elements directed toward color images such as may be created by xerographic or inkjet printers. In xerographic printing, a spectrophotometer in accordance with the present invention is a component of a closed-loop color control system (not shown) that enables the printer to generate reproducible color images in a networked environment.

In operation, optical waves received from such a printed image are guided along the surface of the silicon chip, get dispersed by the grating array 12, and then are focused on the photodiode array 14. In order to efficiently couple the reflected optical waves onto the photodiode array 14, which are originally oriented perpendicular to the wafer surface, a suspended bridge structure 16 is designed to accommodate these diodes such that the photodiodes can be flipped 90 degrees out of the wafer surface to intersect the path of the reflected optical signals.

Figure 2:
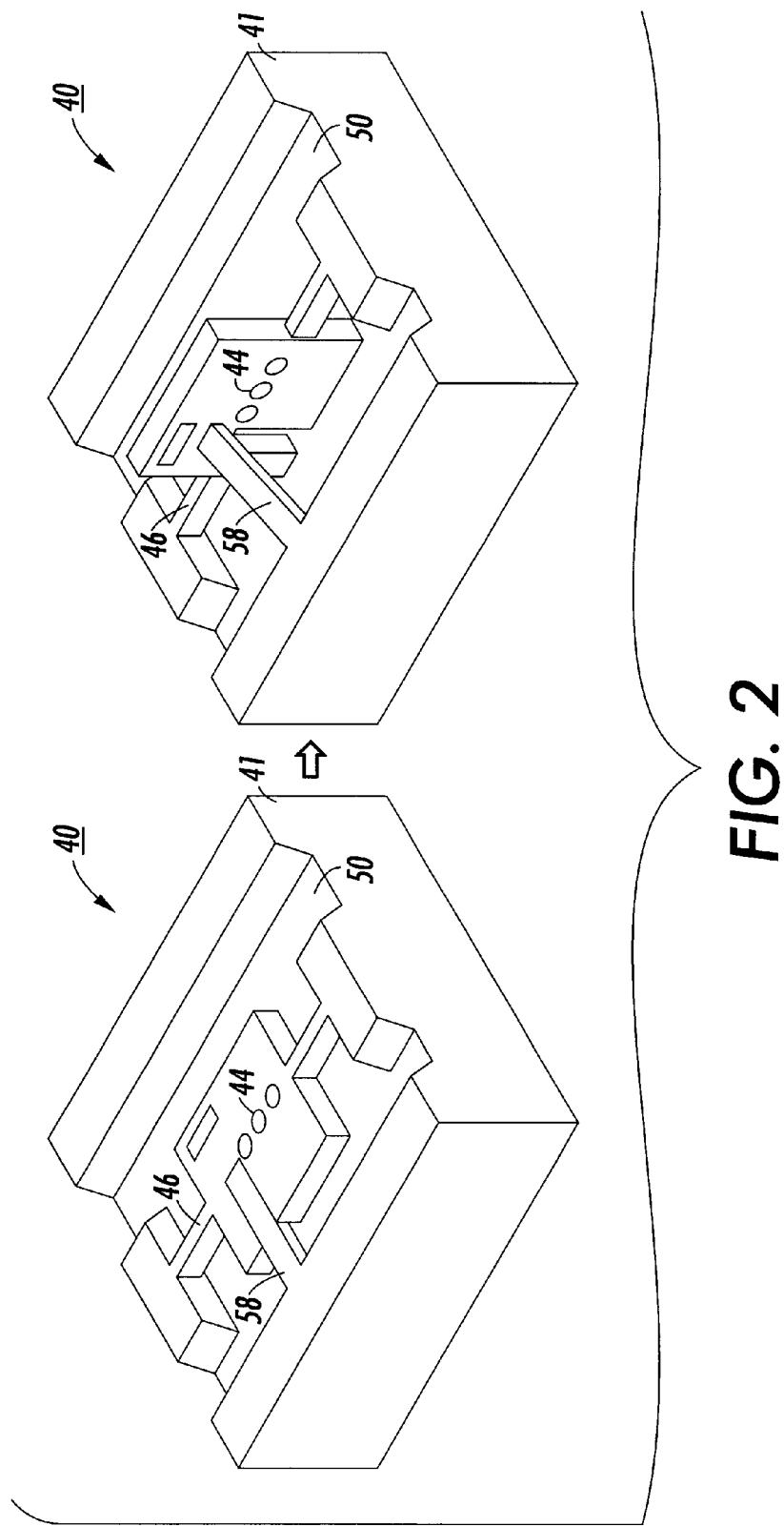
FIG. 2 illustrates a releasable silicon bridge structure with photodiodes bendable 90° from its original orientation after being released from the substrate.

One suitable two step procedure for re-orienting a photodiode array in accordance with the present invention is schematically illustrated by an initial and end view of a structure 40 as shown in FIG. 2. After being released from substrate 41 (initial view), the orientation of a bridge 46 can be rotated 90 degrees from a wafer surface 50 and be fixed at that position by a silicon anchor 58 (end view). This structure 40 is simple to fabricate and results in better efficiency in coupling the optical waveguide into the photodiodes than other approaches such as using a microprism for coupling.

Figure 3:
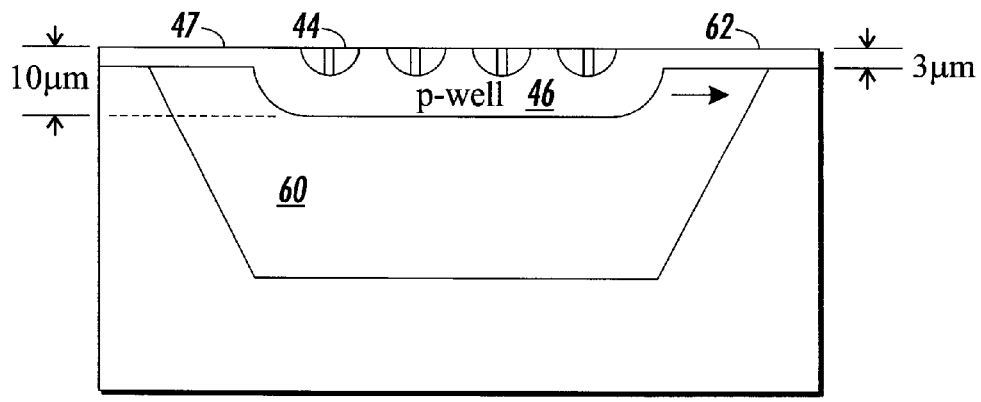
FIG. 3 is a representative cross section of a silicon bridge accommodating the photodiode array.

As illustrated with respect to a cross sectional view FIG. 3, in considering the fabrication process for realizing structure 40, the bridge 46 can be defined by an ion implantation and a subsequent annealing process to form a 10 $\mu$m deep p-well. In this well, another ion implantation is used to construct p-n junctions for the photodiodes. This well/photodiode structure is made compatible with the CMOS process for realizing the signal processing circuitry on this spectrophotometer. The choice of using n-implant in p-well but not the reverse structure as photodiodes is based on two reasons: first is that it is easier to accurately control the diffusion depth of n-dopants than that of p-dopants. This junction depth control is important in achieving high quantum efficiency of converting optical signal into electrical current, especially in the shorter wavelength range, e.g., blue light which requires very shallow junction for efficient detection. The second reason is because of process compatibility, e.g., the p-well structure can be released from the substrate by boron etch stop, which is a well-established process. While a 10 $\mu$m thick p-well plate is used as the bridge for supporting photodiodes, the same thickness of silicon is too stiff to be used as a hinge which needs to be twisted for changing the bridge orientation. In order to form flexible hinges connecting the bridge to the substrate, as shown in FIGS. 2 and 3, a shallow boron diffusion (in hinge area 62) is required. Typically a 3 $\mu$m thick hinge 47 will be capable of being bent easily while being mechanically strong enough to support the bridge structure.

The release of this bridge structure can be achieved by using a selective wet etchant such as EDP or TMAH, which are generally used for releasing suspended structures in CMOS imager arrays. In order to minimize the etch time in this releasing process, the edge of the p-well bridge needs to be aligned to the <100> direction, which has the fastest etch rate in both of these anisotropic etch. As a result, the lightly doped silicon under the n-well can be completely undercut to form cavity 60 in a short time. Typically this kind of direction dependent releasing etch can be finished in less than 40 minutes if the bridge width is no more than 100 $\mu$m.

Figure 4:
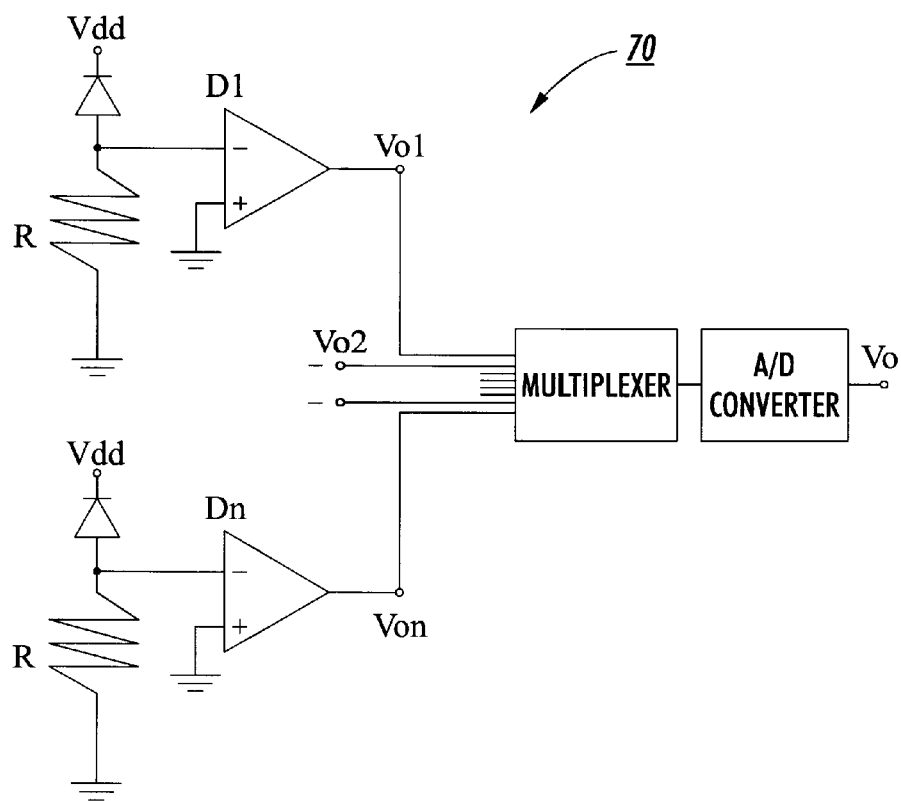
FIG. 4 schematically illustrates readout circuitry for a monolithic spectrophotometer, with output signals from photodiodes amplified by low noise operational amplifiers and multiplexed and converted into digital data for conveyance of outputs through a common data bus.

On a micro spectrophotometer in accordance with the present invention, the dispersed optical signal is detected by a photodiode array and converted into electrical signal. The photodiodes are biased at a fixed reverse bias condition such that most of the carriers generated by incident light can be swept across the depletion region to provide electrical current to the external circuit. FIG. 4 shows a circuit schematic of the readout circuitry 70 for the spectrophotometer. As shown in FIG. 4, the output current from the photodiode is connected to a resistance on which a voltage difference appears whenever incident light generated photocurrent through the diode. This voltage difference is amplified by a low-noise operational amplifier, which can be designed to have a high gain and a specified bandwidth. If the detection of very low-intensity light is required, a unit-gain buffer stage can be added in front of the gain stage such that the signal detected is not deteriorated by thermal noise of the input resistance R. The output of the opamp is then multiplexed and converted into a digital signal and conveyed out of the chip through a common data bus. With this arrangement, the signal-to-noise ratio can be significantly increased and as a result the capability of the chip to sense low-intensity light at high speed is improved. With the addition of the multiplexer and A/D converter, more photodiodes can be put in the array for sensing the dispersed signal without an overflow in the number of the output wires. This is critical for improving the spectral range and resolution of the device. The signal processing circuit on this spectrophotometer will be integrated on-chip and its fabrication process will be combined with that of the photodiodes and the microbridge.

As those skilled in the art will appreciate, other various modifications, extensions, and changes to the foregoing disclosed embodiments of the present invention are contemplated to be within the scope and spirit of the invention as defined in the following claims.

What is claimed is:

1. A method for spectrophotometric analysis of input light comprising
   dispersing input optical waves with a grating defined in a monolithic substrate,
   receiving dispersed optical waves from the grating with a photodiode array defined in a movable support structure on the monolithic substrate, and
   processing signal received from the photodiode array with signal processing circuitry formed on the monolithic substrate and connected to the photodiode array.

2. The method for spectrophotometric analysis of input light of claim 1 wherein the grating is defined in the monolithic substrate to extend perpendicular to a substrate surface of the monolithic substrate.

3. The monolithic spectrophotometer of claim 1 wherein the grating is defined as facets in crystal silicon in the monolithic substrate.

4. The method for spectrophotometric analysis of input light of claim 1 wherein the grating is defined as facets in a polyimide coating on the monolithic substrate.

5. The method for spectrophotometric analysis of input light of claim 1 wherein the grating is defined in a concave wall of a cavity defined in the monolithic substrate.

6. The method for spectrophotometric analysis of input light of claim 1 further comprising an anchor defined in the monolithic substrate, and wherein the movable support structure is permanently lockable in a fixed position using the anchor.

7. The method for spectrophotometric analysis of input light of claim 1 further comprising a bridge defined in monolithic substrate to extend across a cavity in the monolithic substrate, and wherein the photodiode array is defined on the bridge.

8. The method for spectrophotometric analysis of input light of claim 1 further comprising a bridge defined in monolithic substrate to extend across a cavity in the monolithic substrate, and wherein the photodiode array is defined on the bridge to extend perpendicular to a substrate surface of the monolithic substrate.

9. The method for spectrophotometric analysis of input light of claim 1 further comprising the step of positioning an optical fiber conveying optical input in a notch defined in monolithic substrate.

10. The method for spectophotometric analysis of input light of claim 1, wherein the photodiode array extends substantially perpendicular to a surface of the monolithic substrate.

11. A method for spectrophotometric analysis of input light comprising dispersing input optical waves with a grating defined in a monolithic substrate, and directing the dispersed input optical waves at a suspended bridge defined over a cavity in the monolithic substrate, the suspended bridge having a photodiode array to receive dispersed optical waves from the grating.

12. The method for spectrophotometric analysis of input light of claim 11 wherein the grating is defined in the monolithic substrate to extend perpendicular to a substrate surface of the monolithic substrate.

13. The method for spectrophotometric analysis of input light of claim 11 wherein the grating is defined as facets in crystal silicon in the monolithic substrate.

14. The method for spectrophotometric analysis of input light of claim 11 wherein the grating is defined as facets in a polyimide coating on the monolithic substrate.

15. The method for spectrophotometric analysis of input light of claim 11 wherein the grating is defined in a concave wall of a cavity defined in the monolithic substrate.

16. The method for spectrophotometric analysis of input light of claim 11 wherein the suspended bridge is movable to extend substantially perpendicular to a substrate surface of the monolithic substrate.

17. The method for spectrophotometric analysis of input light of claim 11 further comprising the step of positioning an anchor defined in the monolithic substrate to lock the suspended bridge in a fixed position.

18. The method for spectrophotometric analysis of input light of claim 11 wherein the suspended bridge is constructed from p-doped silicon.

19. The method for spectrophotometric analysis of input light of claim 11 further comprising the step of processing signal received from the photodiode array with signal processing circuitry formed on the monolithic substrate.

20. The method for spectrophotometric analysis of input light of claim 11 further comprising the step of positioning an optical fiber conveying optical input in a notch defined in monolithic substrate.

* * * * *